US011657383B2

(12) United States Patent
Berkooz et al.

(10) Patent No.: US 11,657,383 B2
(45) Date of Patent: May 23, 2023

(54) SYSTEM AND METHOD FOR COMMUNICATING A TOKEN TO A MOBILE DEVICE

(71) Applicant: ZF Friedrichshafen AG, Friedrichshafen (DE)

(72) Inventors: Gahl Berkooz, Ann Arbor, MI (US); Thorsten Weber, Berlin (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/093,308

(22) Filed: Nov. 9, 2020

(65) Prior Publication Data

US 2022/0147971 A1    May 12, 2022

(51) Int. Cl.
*G06Q 20/32*    (2012.01)
*G06Q 20/20*    (2012.01)
*G06Q 20/40*    (2012.01)

(52) U.S. Cl.
CPC ....... *G06Q 20/3278* (2013.01); *G06Q 20/206* (2013.01); *G06Q 20/322* (2013.01); *G06Q 20/40* (2013.01)

(58) Field of Classification Search
None
See application file for complete search history.

(56) References Cited

U.S. PATENT DOCUMENTS

| 8,627,438 | B1 * | 1/2014 | Bhimanaik | H04L 63/08 |
| | | | | 726/9 |
| 10,949,827 | B1 * | 3/2021 | Gaudin | G06Q 20/145 |
| 10,973,060 | B2 * | 4/2021 | Ravi | H04W 76/10 |
| 2020/0013048 | A1 * | 1/2020 | Love | G06Q 20/204 |
| 2020/0258074 | A1 * | 8/2020 | Chang | G06Q 20/40 |
| 2021/0125164 | A1 * | 4/2021 | Mehrhoff | G06Q 20/20 |

* cited by examiner

*Primary Examiner* — Namrata Boveja
*Assistant Examiner* — Amit Patel
(74) *Attorney, Agent, or Firm* — Crowell & Moring LLP

(57) ABSTRACT

A method of communicating a token to a mobile device includes a server or computing device issuing a token, the token defining a bond for a transaction associated with a vehicle and associated with an entity. The method also includes transferring the token to a mobile device. The token can then be communicated from the mobile device to a point of sale (POS) device to enable completion of the transaction associated with the vehicle.

11 Claims, 6 Drawing Sheets

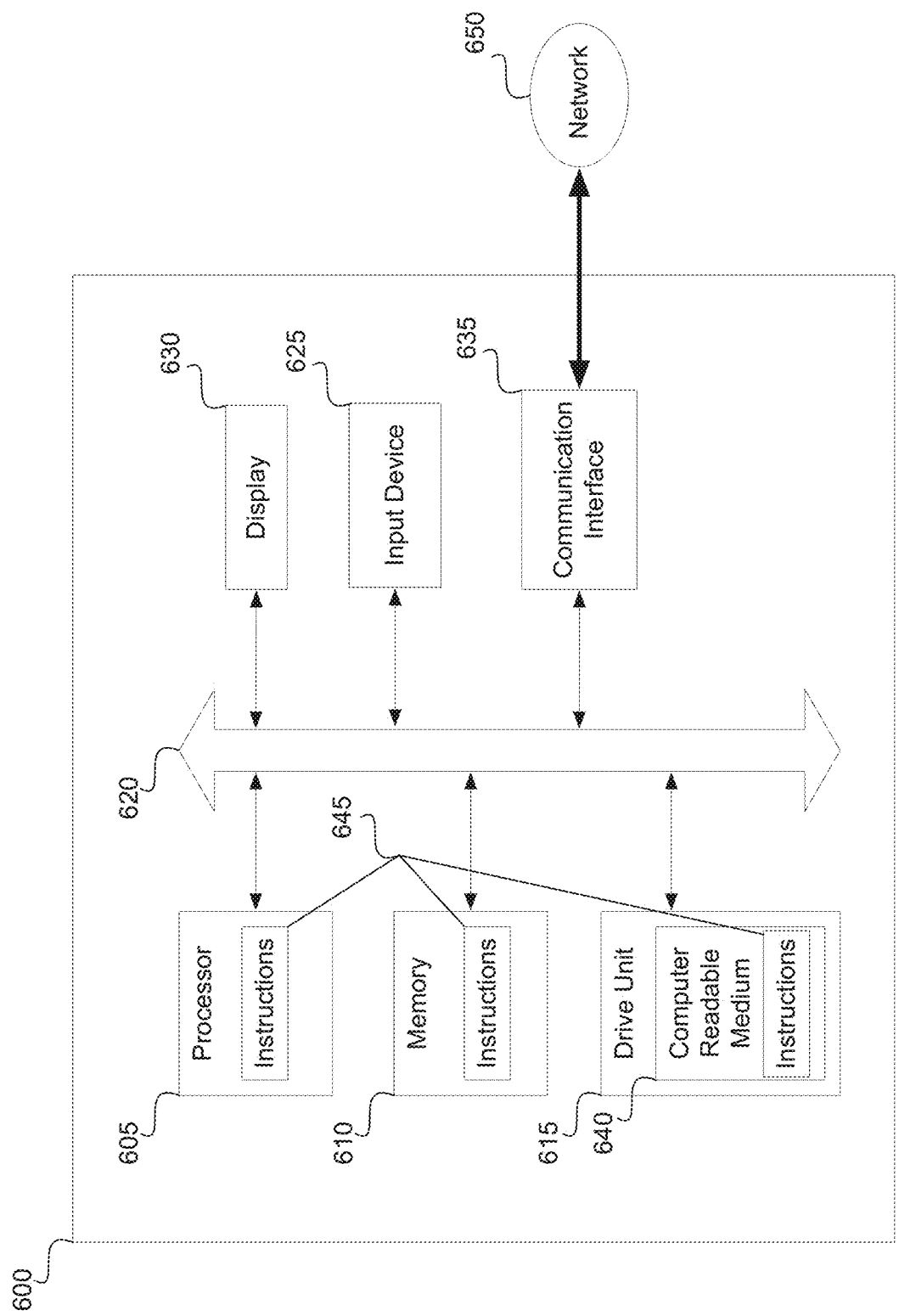

SYSTEM AND METHOD FOR COMMUNICATING A TOKEN TO A MOBILE DEVICE

BACKGROUND

Field

This application generally relates to transferring tokens or other data from a token issuer to a mobile device for use of the tokens in various transaction settings.

Description of Related Art

Transactions are often performed using tokens or other forms of digital data within a transaction network (e.g., a blockchain network, a distributed database, or a distributed ledger) to enable the completion of the transaction. In a vehicle setting, tokens may enable a driver of a vehicle, or another individual or entity associated with the vehicle, who may not be the owner of the vehicle (e.g., in a fleet or corporate ownership setting), to purchase goods or services (e.g., fuel, oil, maintenance, and/or service for the vehicle) for the vehicle.

BRIEF SUMMARY

In one aspect, a method of communicating a token to a mobile device includes a server or computing device issuing a token, the token defining a bond for a transaction associated with a vehicle and associated with an entity. The method also includes transferring the token to a mobile device. The token can then be communicated from the mobile device to a point of sale (POS) device to enable completion of the transaction associated with the vehicle.

BRIEF DESCRIPTION OF THE DRAWINGS

FIG. 6 illustrates an exemplary computer system that may form part of or implement the systems described in the figures or in the following paragraphs.

DETAILED DESCRIPTION

Figure 1:
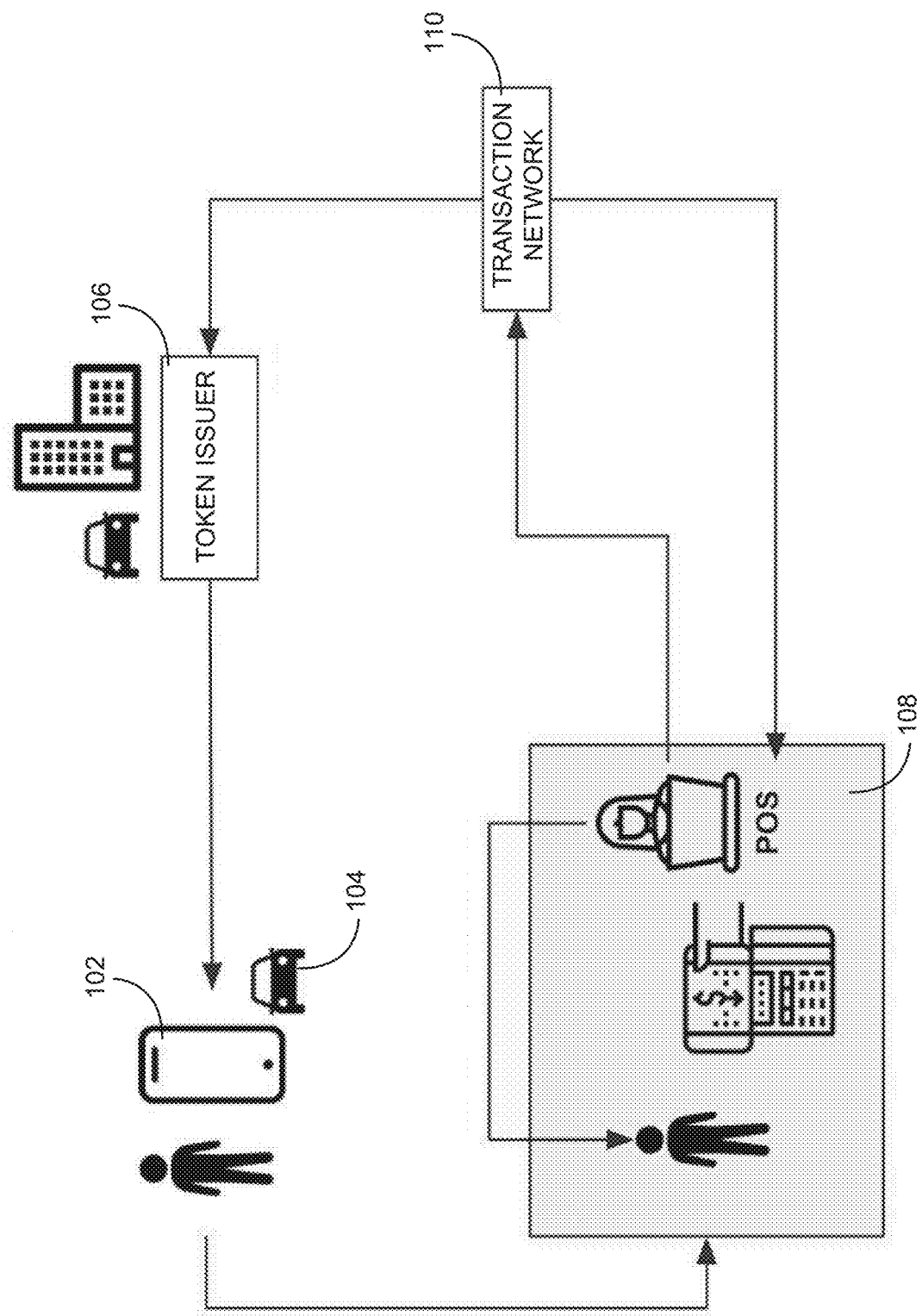
FIG. 1 is a system diagram providing a high-level description of the overall system and transaction process in accordance with various embodiments.

Tokens or other forms of digital data are often used to facilitate completion of transactions within a transaction network (e.g., a blockchain network, a distributed database, or a distributed ledger). In a vehicle setting, tokens may enable a driver of a vehicle, or another individual or entity associated with the vehicle, who may not be the owner of the vehicle (e.g., in a fleet or corporate ownership setting), to purchase goods or services (e.g., fuel, oil, maintenance, and/or service for the vehicle) for the vehicle. Further, with the proliferation of autonomous vehicles, tokens present a solution to enable the vehicle to perform transactions autonomously (e.g., refuel or recharge by itself).

Previous systems to enable payment for goods or services may include a standard fuel card, which may enable a driver to fuel a vehicle with which the card is associated. However, the fuel card may have little actual connection to the vehicle, perhaps other than typing in a mileage of the vehicle. As such, due to the very limited verification utilized with such cards, users may misuse fuel cards to purchase fuel for other unassociated and unauthorized vehicles.

Using tokens that are maintained within a blockchain transaction network or another distributed network or ledger, and which represent a currency (digital or fiat), may prevent such missuses by including one or more additional conditions that prevent the misuse of the token. For example, the token may include conditions regarding geographical limitations, limitations on a proximity to the vehicle, timing limitations, limitations on vehicle conditions, and conditions on types of goods or services that may be purchased for the vehicle.

In one example, tokens are transmitted to the vehicle from a token issuer through a network. The tokens may then be stored within the vehicle and may be transmitted directly by the vehicle to point of service system. For example, if the vehicle is in a refueling station and the driver needs to refuel the vehicle, the vehicle may communicate with the token issuer to request a token for refueling (possibly sending GPS data and/or other location data or identification data of the vehicle and/or the point of sale location). The token issuer may transmit the token to the vehicle. A communication system of the vehicle may then transmit the token to a communication receiver near the fuel pump of the fueling station, which is near the location of the vehicle. After the communication receiver of the fueling station receives the token, the point of sale system for the fueling system may communicate with the distributed transaction network to verify the token and to complete the transaction. At this time, the fueling pump then enables the driver (or the vehicle itself) to refuel the vehicle. This arrangement helps ensure that the fuel is being using for the vehicle by enabling direct communication of the token from the vehicle to the POS for the fueling station. Further, the transaction network may ensure that other limitations may be met for the use of the token, for example, based on the geographical location of the vehicle, timing, condition of the car, etc.

A problem exists in the above described example system in that if the driver needs to purchase goods or services other than fuel for the vehicle (e.g., a bottle of oil, washer fluid, parts, service, and/or maintenance), it can be difficult for the user to do so using the above described token communication arrangement. In particular, the driver may need to perform a transaction at a location that is physically remote from the vehicle. For example, if the driver needs to purchase a bottle of oil for the vehicle, the driver may need to enter the fuel station shop and complete the transaction with a cashier within the shop building. In most configurations, there is no way for the vehicle to directly communicate a token to the cashier to enable completion of the transaction.

In accordance with the various embodiments disclosed herein, technical solutions to the above identified problem are provided. At a high-level, the disclosed solutions provides methods to enable transferring of the token (e.g., transferring of the right to perform a transaction) from the vehicle to a mobile device in order to enable the holder of the mobile device to complete the transaction at a POS location with which the vehicle cannot communicate (e.g., which is physically distant from the vehicle). Such a transfer of the token and/or right from the vehicle to the mobile device may be direct or indirect, according to different embodiments as described herein.

FIG. 1 is a system diagram that provides a high-level description of the overall system and transaction process in accordance with various embodiments. The overall system may include a mobile device 102, a vehicle 104, a token issuer 106, a point of sale (POS) 108, and a transaction network 110 implementing a distributed database.

In various embodiments, the mobile device 102 comprises a mobile phone, smartphone, smartwatch, tablet, or another similar mobile electronic device. In other embodiments, the mobile device 102 may be a smartcard or chip card capable of storing digital data including a token. In yet other embodiments, the mobile device 102 may be a key or key fob for the vehicle, which may also be capable of storing the token. In various embodiments, and as is described in additional detail elsewhere herein, the mobile device 102 may include a processor, a memory (e.g., to store the token), and a communication interface to receive and transmit the token. The processor, along with the aspects of the mobile device 102, may be configured to perform some or all of the various operations and functions disclosed herein. Other examples of mobile devices 102 are possible, and will be readily apparent to those of skill in the art.

In some examples, for security reasons, the mobile device 102 may require user interaction to reach a read state, thereby preventing unwanted reading of data stored within the mobile device 102. For example, if the mobile device 102 is a smartphone, it may require the user to enter a passcode in order to unlock and open a software application that allows for transfer of secured data, such as tokens or keys. However, if the mobile device 102 is another, more passive device, such as a key fob or a chip card or smartcard, the mobile device 102 may include a read activation means, such as an actuator, that enables the secured data to be read out of the mobile device 102. Other variations are possible.

The vehicle 104 may comprise a passenger car, a truck, a motorcycle, a bicycle, a boat, an airplane, or any other vehicle that may require goods or services. In various embodiments, like the mobile device 102, and as is described in additional detail elsewhere herein, the vehicle 104 may include a processor, a memory (e.g., to store the token), and a communication interface to receive and transmit the token. In certain embodiments, the vehicle 104 may also include other electronic components such as location determination devices (e.g., GPS systems) and human-machine interfaces, such as an infotainment center including a display. The processor, along with the aspects of the vehicle 104, may be configured to perform some or all of the various operations and functions disclosed herein. The vehicle may also include other electronic and mechanical parts to enable driving the vehicle, as is understood in the art.

The token issuer 106 may include an owner of the vehicle 104, a fleet manager for the vehicle 104, a manufacturer of the vehicle 104, or any other entity that has an interest in or an obligation (contractual or otherwise) to pay for the purchase of goods or services for the vehicle 104.

The point of sale (POS) 108 may be any point of sale equipment that enables transactions such as purchase of and/or payment for goods or services. In various examples, such transactions are retail and provide for the receipt of payment in exchange for the goods or services rendered. In various embodiments, a POS 108 may include communication interfaces to enable communication with a mobile device 102 (such as a mobile phone or a chip card), as well as a network interface to communicate with other computers on at network. A specific POS terminal and/or POS system may be capable of communicating with the distributed database in the transaction network 110 in order to verify and complete transactions within and using the distributed database.

The transaction network 110 may include a network of computers and/or servers that perform processes on a distributed (e.g., decentralized) database and/or distributed ledger to maintain, update, and verify entries within the distributed database or ledger. In various embodiments, the distributed database is implemented as a blockchain database, using a new or an existing blockchain platform such as Bitcoin, Ethereum, Ripple, Litecoin, or other blockchain platforms.

As used herein, the distributed (or decentralized) database may be implemented and maintained by a network of distributed or decentralized machines. In various embodiments, the distributed database or distributed ledger corresponds to a blockchain database. In this regard, the blockchain database may be utilized as a way to construct consensus around the validity of transactions, and to ensure that all changes are auditable. Stated differently, the blockchain database corresponds to a record of consensus with a cryptographic audit trail that is maintained and validated by each system. Blockchains of the blockchain database act as a way to record the order and data of, and validate the transactions in, the blockchain database. As discussed herein, in various embodiments, the blockchains further facilitate value transfer between the parties without the usual requirement for a trusted third party. Moreover, such a database facilitates the implementation of smart contracts (e.g., for business rules) that automate processes on such a database (e.g., for defining contractual terms and limitations on transactions).

Specifically, the distributed database may be organized such that a block is generated for each transaction and can be a store of data, such as the transaction information, rules, smart contract limitations, token identities, etc. The data stored in a block may be hashed for storage in a chain or tree structure. As each transaction in each block occurs, each block may then be linked to a previous block of transactions. The blockchain may be the arrangement of the blocks in groups. Blockchain may be referred to as a protocol or may include a specific protocol for utilizing blockchain technology. Being decentralized means that there is not a single point of failure as compared to a centralized database for storing information. A distributed or decentralized database, for example, built using blockchain technology, may remove the need for centralized institutions and databases. Everyone on the blockchain may be able to view and validate the transaction. The blockchain may be further secured by public-key cryptography with a public key being an address on the blockchain and a private key acting as a password to give an owner access to the data.

The blockchain structure may be formed from hashchains. A hash function can convert data into a different form. The hash function can be repeated with the results being combined into a series of hashes that may be referred to as a hashchain. In a hashchain, no data can be modified in individual blocks without affecting all subsequent blocks. The public key cryptography may be used to authorize creation of new blocks in the chain. In a blockchain, there may be hashchains placed inside one another. Because identity information may be sensitive, that information can be stored securely and accurately. Data quality may be based on multiple copies of the Blockchain through database replication due to there being no centralized copy.

A blockchain network may be used to create a database where anything of value (e.g. property, shares, money, deposits, etc.) can be stored. When the ownership is transferred, everyone in the network may receive notification about the transfer. The majority of the owners on the network may approve the transfers of ownership before being added to the blockchain as a record that everyone can see. If the owner of the item (e.g. property, asset, cash, etc.) tries to sell the same item to two different entities, everyone on the network will see the duplicate transfer and one of the transfers will be rejected by the network. Blockchain offers improvements in transparency compared to the existing ledgers for many industries, in part by removing intermediaries involved in the record-keeping and in the transfer of assets thus saving costs. The removal of intermediaries allows for increased transaction speeds.

Additionally, the transaction network 110 may comprise a network of computers and/or servers that implement a token platform that maintains records of the tokens and verifies the tokens. A token may refer to assets and/or rights that are collectively managed within the distributed database or ledger by the network of computers. The distributed database ledger may provide an infrastructure in the form of a distributed record of transactions that keeps track of the owners of each token (e.g., which electronic wallet address owns or is associated with which token). A token platform may be an existing token platform, such as Ethereum, and may be associated with and sit on top of an existing known blockchain platform, such as those listed above. In various approaches, the tokens may be generated in accordance with existing token protocols, such as ECR20.

Tokens may represent a set of rules that may be encoded in a smart contract. In various approaches, each token belongs to a blockchain address. These tokens are accessible with a dedicated electronic wallet software that communicates with the distributed database and manages a public-private key pair related to the blockchain address. Only the person (e.g., possessing the electronic wallet data) who has the private key for that address can access the respective tokens. This person (e.g., electronic wallet) is regarded as the owner or custodian of that token. The token owner (via electronic wallet software) can initiate transfer of the token, for example, by signing with their private key, which in turn generates a digital fingerprint or digital signature.

In various embodiments, the token, as is understood in the art, may be data that represents a unit of value (e.g., currency, cryptocurrency, goods, services) that may be fungible (tradable), and which may be subject to one or particular uses, and which may be issued by an entity. In more specific examples, a token may be data that represents a bond between the token issuer (e.g., a fleet manager, a vehicle owner, a vehicle manufacturer or seller, or any other entity or party) and the holder of the token. In the example context of goods or services for a vehicle, the bond may be a promise on part of the token issuer to pay for or to provide those goods or services for the vehicle. The token may be recorded and maintained within the distributed database. In various embodiments, as is understood in the art, the token may be a utility token or a fungible token, which may be used in exchange for or to purchase goods or services, for example, for the vehicle. In this manner, tokens operate much like a digital voucher or coupon that allow for the purchase of the goods or services for the vehicle. In another analogy, tokens may be like physical tokens in an arcade, wherein the token holder is provided with a service (access to play the video game) in exchange for the token.

The token may include or be subject to one or more contractual limitations, which may be established by smart contracts arranged by the issuing entity. For example, in the vehicle goods or services context setting, there may be a requirement that the tokens are used only for goods or services for the vehicle that fall within one or more preapproved categories of goods or services (e.g., fuel, oil, maintenance, service, etc.). Other contractual limitations to the token may apply as well that relate to, for example, timing, amounts or quantities, geographical limitations, authorized users, etc.

An example of a high-level overall flow is described in accordance with various embodiments with continued reference to FIG. 1. The token issuer 106 may generate and/or issue a token. The token generation and/or issuance may be performed in direct response to a request from the vehicle 104 and/or the driver (e.g., via the mobile device 102 or another device) to perform a transaction, or may be generated and/or issued at a prior time. For example, the driver may need to refuel and may request the token for refueling prior to or after arriving at a fueling station. In other examples, the token issuer may issue tokens without prior request, for example, based on a time schedule, based on a mileage schedule, based on information received about or from the vehicle 104, or based on any other criteria.

As mentioned above, the token may represent a bond between the token issuer 106 and the holder of the token (e.g., the vehicle 104, the driver, etc.). In this example, the bond may be a promise by the token issuer 106 to pay for goods or services for the vehicle 104. The token issuer 106 may cause the token to be recorded and maintained within the distributed database. The tokenized bond may then be sent to the vehicle 104 or sent to the mobile device 102. In various embodiments, if sent to the vehicle 104 first, the token can subsequently be sent to the mobile device 102.

Once the token has been transmitted to the mobile device 102, the mobile device 102 can interact with the POS 108 to enable the user or driver to purchase goods or services for the vehicle 104 at the POS 108. The token can be transferred from the mobile device 102 to the POS 108. The POS 108 can then trigger redemption of the token by communicating with the transaction network 110 to validate the token within the distributed database. The transaction network 110, for example a blockchain platform, may retrieve information and a tx signature key for the token issuer 106. The transaction network 110 may then use the tx signature key to directly issue a transaction (e.g., in the form of a transaction hash or "tx") in the name of the token issuer 106. The issuance of the transaction tx on behalf of the token issuer 106 may occur within the distributed database without interference or action on part of the token issuer 106. Additionally, the transaction network 110 may void the token (e.g., to prevent double spending) by writing the signature of the token to the distributed database or distributed ledger. The transaction network 110 may then send confirmation back to the POS 108 that the token was validated and the transaction created and stored within the distributed database. The POS 108 may then provide confirmation back to the user (for example, to the mobile device 102) that the transaction is completed. The driver can then take the goods, or the services can be performed for the vehicle 104.

Additionally, with the transaction tx having been captured within the distributed database, the transaction network 110 can send a notification to the token issuer 106 of the transaction. This notification can be sent asynchronously to the token issuer 106, such that the transaction may be performed prior to and without direct prior notification of the transaction by token issuer 106, thereby allowing the token-based transaction to occur quickly.

In alternative embodiments, the token may be communicated to the POS 108 directly from the vehicle 104 or through a network. In such alternative embodiments, the mobile device 102 might not be required to receive the token.

Figure 2:
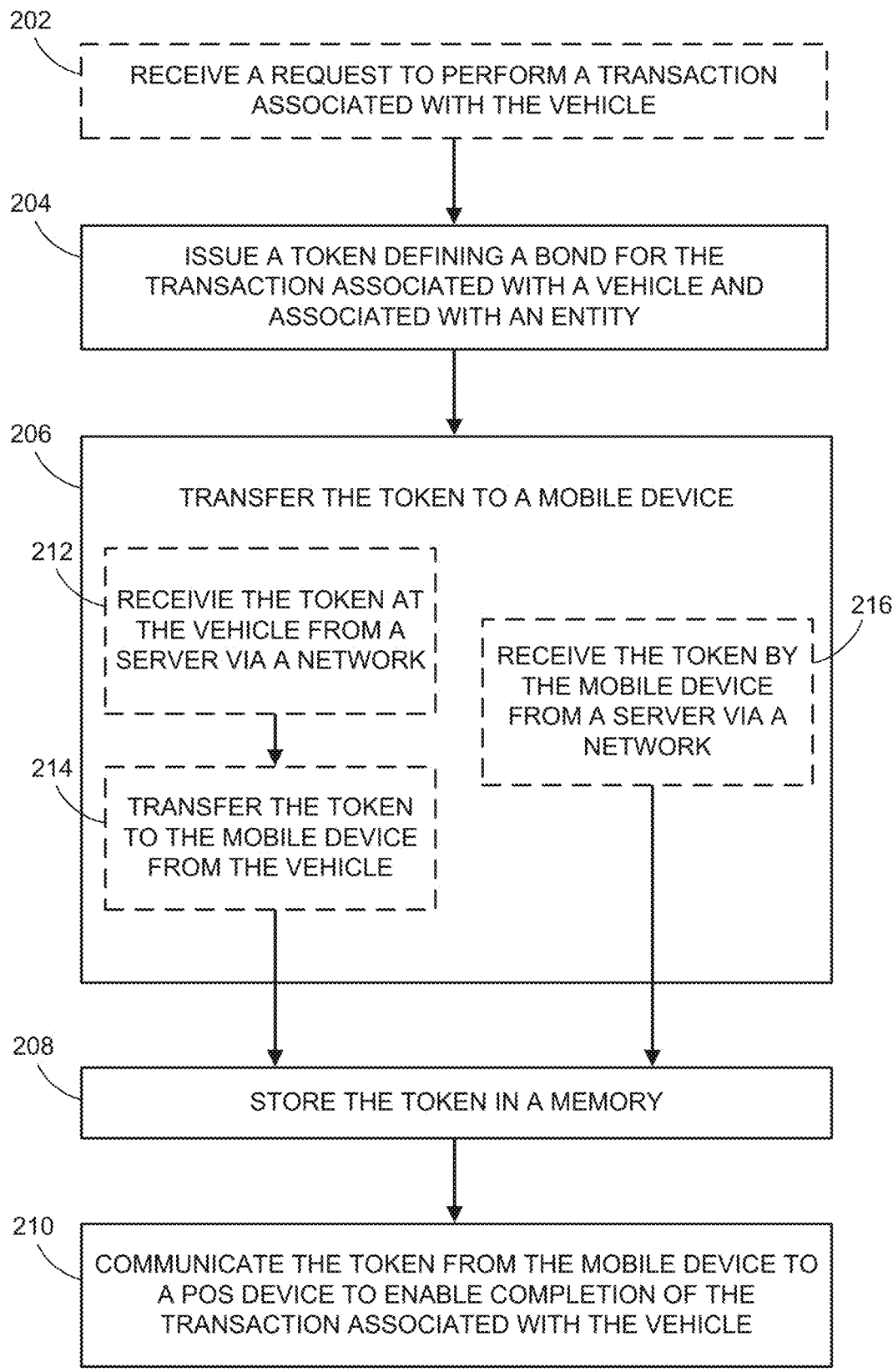
FIG. 2 shows a logic flow diagram illustrating various exemplary operations that may be performed by the system.

FIG. 2 shows a logic flow diagram illustrating various exemplary operations that may be performed by the system, which may comprise a method performed by the system. FIG. 2 is discussed with reference to FIG. 3 and FIG. 4, each of which show system diagrams illustrating additional details of the operations in accordance with various embodiments.

At 204, a token may be generated and/or issued. The token may define a bond for a transaction associated with the vehicle 104 and associated with an entity, such as the token issuer 106. In various embodiments, a server issues the token. For example, the server may be owned and operated by the token issuer 106, or the server may issue the token on instruction from the token issuer 106. The server may be connected to and/or part of the transaction network 110, which may implement the distributed database. The issuance of the token may be recorded within the distributed database by the transaction network 110, for example, based on information from the token issuer 106.

In another example, the token may be generated by the vehicle 104.

In another example, a node (e.g., server or computer) on the transaction network 110 generates and issues the token, for example, using smart contracts. The smart contracts can define one or more contractual terms or rules that limit the use of the token. For example, the smart contract can define rules and limitations for how the tokens are to be redeemed or utilized. These rules may include time-based limitations (e.g., one or more time windows in which the tokens can be utilized, or an expiration date/time for the token). These rules may include specific goods or services for which the tokens are redeemable. For example, token redemption could be limited to transactions for a bottle of oil, fuel, wiper blades, or other goods for the vehicle 104, but may exclude transactions for other goods such as snacks and drinks. In another example, token redemption could be limited to transactions for particular services or maintenance performed on the vehicle (e.g., changing the brakes), while excluding other service (e.g., replacing the cabin filter). In another example, token redemption could be limited to maximum or minimum amounts (e.g. costs) for the goods or services. In other examples, token redemption could be limited to certain geographical locations (e.g., the state of Illinois, the country of Germany, the gas station at 123 Main Street, etc.) or relative geographical locations (e.g., within 500 feet of the vehicle, within 20 miles of a location the vehicle 104 was where the token was issued, etc.). The different variations on the rules and limitations that may be placed on the token are essentially limitless, and as such, the token presents a flexible and versatile mechanism to enable transactions of various kinds to occur according to the present disclosure.

In an optional step, at 202, at least one server can generate and/or issue the token in response to receiving a request to perform the transaction associated with the vehicle 104 prior to issuing the token. The transaction may be a purchase of goods and/or services for the vehicle, wherein the purchase is funded by or paid for an entity such as the token issuer 106. In various examples, a user or driver may request to perform the transaction prior to the time of purchase of the goods or services. For example, the user or driver may interact with an infotainment center or other human-machine interface of the vehicle 104 or an application of the mobile device 102 (e.g., a mobile phone) to request a token for the transaction. The vehicle 104 or the mobile device 102 may then communicate the request to perform the transaction associated with the vehicle 104 prior to receiving the token.

The user or driver may specify the purpose of the transaction (e.g., need fuel, need new brakes) and/or may indicate a quantity or price of goods or services required (e.g., 20 gallons, need front and rear brakes). The user or driver may request the token prior to a trip, during a trip, upon arrival at a location including the POS 108 (e.g., at the fueling station), or possibly at any time of need. Further, the driver may request a token for a later time (e.g., for a scheduled service appointment, or for fuel for an upcoming trip) well in advance. In other embodiments, the vehicle 104 can automatically request the token, for example, in response to sensed conditions (e.g., fuel is low, brakes are low, wiper fluid is out, a tire is flat, an O2 sensor is malfunctioning, etc.), or in response to a schedule (e.g., 12-month or 5,000 mile oil change is due). In other embodiments, the vehicle or the mobile device may send reminders or permission requests to the user or driver to either request the token for the needed goods and services or to provide permission for the vehicle 104 to request the token.

At 206, the token may be transferred to the mobile device 102, wherein the mobile device 102 may receive the token via a communication interface. The token may define a bond for a transaction associated with the vehicle 104 and associated with an entity, such as the token issuer 106. As is shown within 206, there are multiple ways to enable the transfer of the token to the mobile device 102 in accordance with different embodiments, various ones of which are described below in further detail and with reference to FIGS. 3 and 4. At 208, the mobile device 102 may store the token in a memory of the mobile device 102. The memory may comprise a secure element (SE) within the mobile device 102, or may comprise some other kind of memory. The mobile device 102 may provide a notification to the user upon receipt of a token.

At 210, the mobile device 102 communicates the token from the mobile device 102 to a read device of the POS 108, for example, via the communication interface of the mobile device 102, to enable completion of the transaction associated with the vehicle 104. This transfer may occur through various known wired and wireless communication protocols. For example, if the mobile device 102 is a chip card, the chip card may be inserted into a chip card reading unit at the POS 108, which may directly communicate with the mobile device 102 through physical connection at contacts on the chip card. In other examples, the mobile device 102 may communicate with the POS 108 using known near-field communication (NFC) technology to enable transfer of the token from the mobile device 102 to the POS 108. Other known communication protocols may also be employed for communications between the mobile device 102 and the POS 108 including, for example, Wi-Fi, Bluetooth, or others.

As mentioned above, upon receipt of the token by the POS 108, the POS 108 may communicate with the transaction network 110 to validate the token and to record and/or trigger a transaction involving the token within the distributed database or distributed ledger (e.g., blockchain network). At this time, once the token is validated and the transaction is recorded on the distributed database, from the perspective of the POS 108 and the driver of the vehicle 104, the transaction is completed and the driver or the vehicle 104 may receive the goods or services. After the transaction is recorded in the distributed database, the transaction information within the distributed database can be used for invoicing and billing to provide payment for the purchased goods or services for the vehicle 104.

Figure 3:
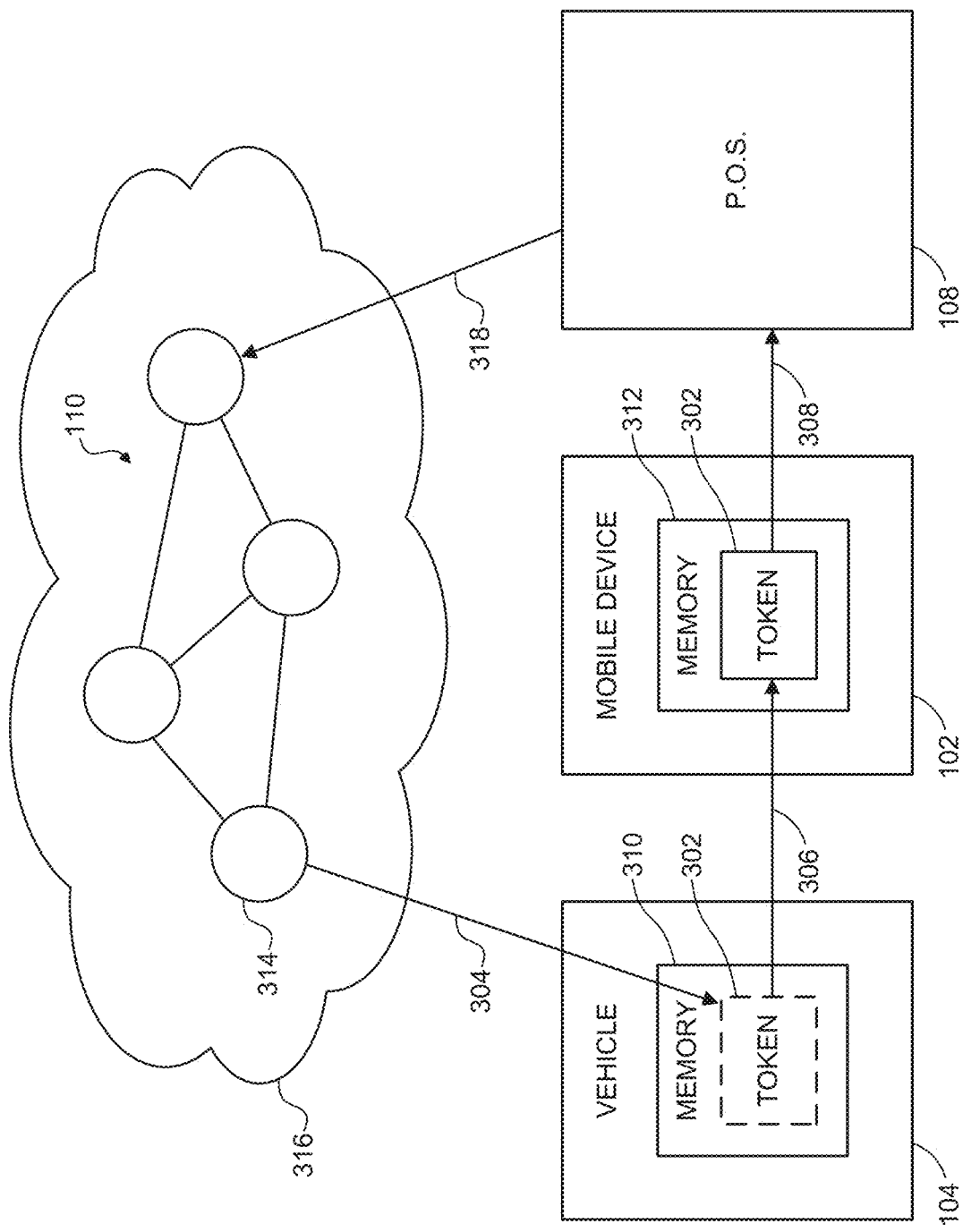
FIG. 3 shows a system diagram illustrating additional details of operations of the system in accordance with various embodiments.
Figure 4:
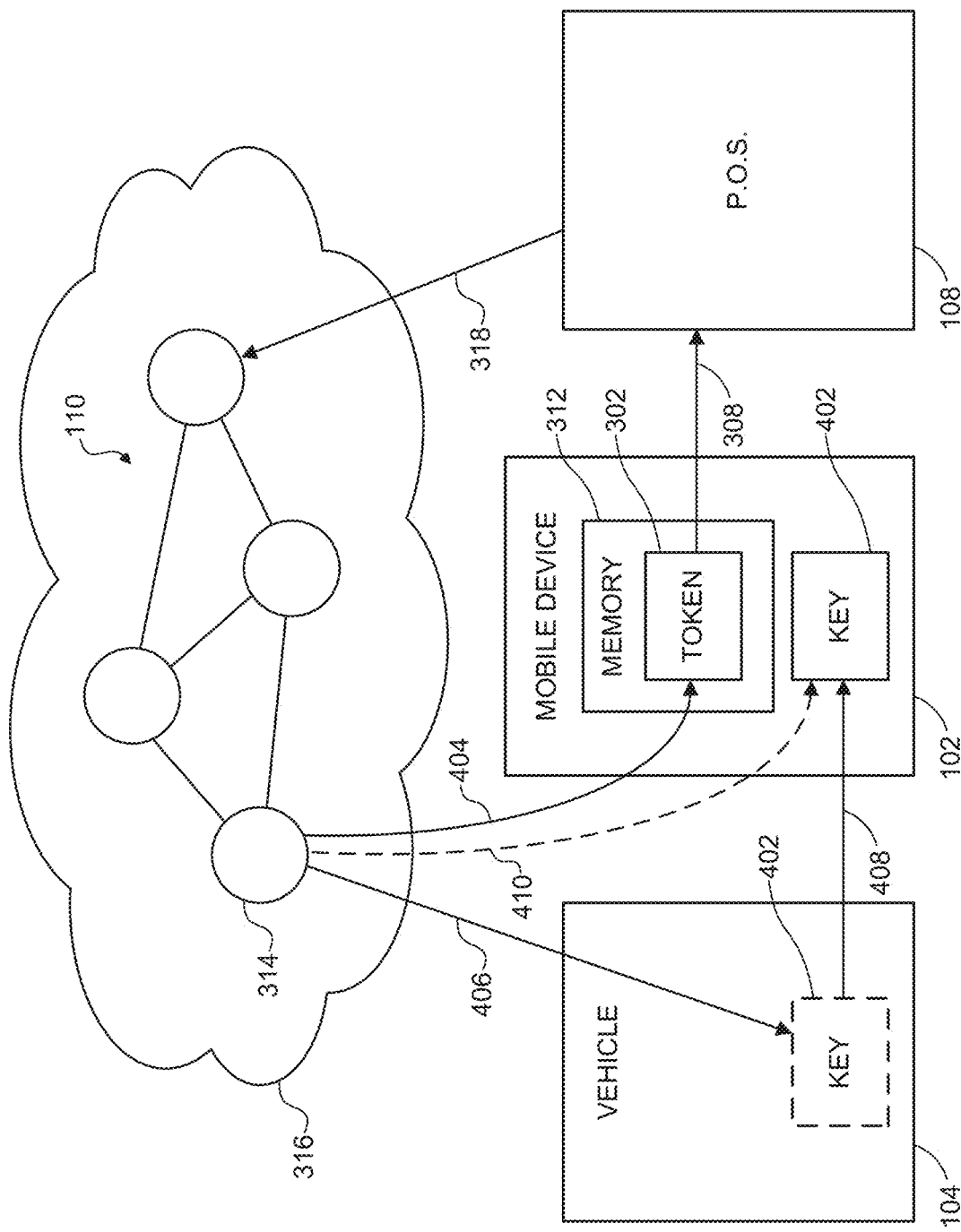
FIG. 4 shows another system diagram illustrating additional details of operations of the system in accordance with various embodiments.

FIGS. 3 and 4 each show system diagrams illustrating additional details of the operations in accordance with various embodiments. FIGS. 3 and 4 both illustrate the transaction network 110, the vehicle 104, the mobile device 102, and the POS 108. A communication network 316 is shown, which may include the Internet in various embodiments. A token 302 is shown. The vehicle 104 includes a memory 310, such as a secure element (SE), capable of securely storing tokens or other data. Similarly, the mobile device 102 also includes a memory 312, such as a secure element (SE), which is also capable of securely storing tokens or other data. FIGS. 3 and 4 both show, at 308, a transfer of the token 302 from the mobile device 102 to the POS 108. FIGS. 3 and 4 also both show, at 318, communication regarding the token 302 occurring between the POS 108 and the transaction network 110. However, the primary differences between FIGS. 3 and 4 is how the mobile device 102 receives the token 302.

With reference to FIG. 2 and the FIG. 3, a first approach to transferring the token 302 to the mobile device 102 (e.g., a first approach to step 206 in FIG. 2) is illustrated in accordance with at least some embodiments. In this example embodiment the token 302 is transferred from the vehicle 104 to the mobile device 102 instead of directly from the network. At step 212, the vehicle may receive the token 302 from at least one server (e.g., node 314) via the communication network 316 prior to transferring the token 302 to the mobile device 102. With reference to FIG. 3, the transfer of the token 302 from the at least one server (e.g., node 314) to the vehicle 104 is shown at 304. For example, a communication interface of the vehicle 104 may communicate via the communication network 316 (e.g., wirelessly via a cellular data connection, Wi-Fi, or another data network connection) with at least one node 314 (which may be a server or a computer) also connected to the communication network 316. The node 314 may represent a computing device on the transaction network 110 or that is connected to the transaction network 110, and/or may also be a backend system or server for the token issuer 106 or a system or server for a third party operating on behalf of or in connection with the token issuer 106. Upon receipt of the token 302, the vehicle 204 may store the token 302 in its memory 310. In other embodiments, the vehicle 204 may generate and issue the token 302 without receiving the token from the server (e.g., node 314) or the communication network 316.

In FIG. 2, at 214, the vehicle 204 may transfer the token to the mobile device 102, and the mobile device 102 may receive the token and store the token within its memory 312. With reference to FIG. 3, the transfer of the token 302 from the vehicle 204 to the mobile device 102 is shown at 306. In various embodiments, the vehicle 204 may transfer the token 302 to the mobile device 102, and the mobile device 102 may receive the token 302 from the vehicle 104 using a communication protocol and/or network established between the mobile device 102 and the vehicle 104, for example, wirelessly using near-field communications, Bluetooth, or Wi-Fi, or directly wired via a USB or Lightning connection.

In this embodiment, because the token 302 is transferred directly from the vehicle 204 to the mobile device 102, the "right" to complete a transaction with the token 302 (e.g., also subject to the limitations of the token 302) is directly transferred from the vehicle 204 to the mobile device 102. Accordingly, the user or holder of the mobile device 102 with the token 302 can subsequently perform a transaction at a POS 108 with which the vehicle 204 cannot directly communicate. For example, the transfer of the token 302 may enable the user or driver to still complete a token-based transactions in situations where legacy setups require the use of conventional technology or involve a payment for physical goods or services that have to be identified by the user.

Referring now to FIGS. 2 and 4, a second approach to transferring the token 302 to the mobile device 102 (e.g., a second approach to step 206 in FIG. 2) is illustrated in accordance with at least some embodiments. In this example embodiment the token 302 is transferred from the network to the mobile device 102 instead of from the vehicle 104. At step 216, the mobile device 102 receives the token from at least one server (e.g., node 314) via the communication network 316, for example, via a communication interface of the mobile device 102. With reference to FIG. 4, the transfer of the token 302 from the at least one server (e.g., node 314) to the mobile device 102 is shown at 404. In various approaches, like the vehicle 104, a communication interface of the mobile device 102 may communicate via the communication network 316 (e.g., wirelessly via a cellular data connection, Wi-Fi, or another data network connection) with at least one node 314 (which may be a server or a computer) also connected to the communication network 316. The node 314 may represent a computing device on the transaction network 110 or that is connected to the transaction network 110, and/or may also be a backend system or server for the token issuer 106 or a system or server for a third party operating on behalf of or in connection with the token issuer 106. Upon receipt of the token 302, the mobile device 102 may store the token 302 in its memory 312.

The first approach to token transmission, shown in FIG. 3, inherently provides a level of authentication of the mobile device 102 (e.g., of the user) and the transaction. Because the token is transferred from the vehicle 104 to the mobile device 102, it can be inherently assumed, at least to a degree, that the mobile device 102 is associated with the vehicle 104 (in part because it may be connected to the vehicle 104 and relatively close to the vehicle 104). As such, the transaction can be assumed to properly be for the vehicle 104, and that the mobile station 102 and user are the proper mobile station 102 and user to have received the token to perform the transaction.

However, when the token comes to the mobile station 102 via a route that does not include the vehicle 104 (e.g., directly from the communication network 316), as with the second approach shown in FIG. 4, there may be a concern that an incorrect mobile device 102 or user could receive the token (possibly in response to a request for the token). Accordingly, a secondary method to verify the mobile device 102 as the proper recipient of the token is disclosed. In one approach, the token may be transferred directly to the mobile device 102 from the network only when the mobile device 102 is in proximity of the vehicle 104 and/or in communication with the vehicle 104. This helps ensure that the mobile device 102 is the correct intended mobile device 102.

In various other approaches, though, the verification method may include the communication of a key or a secret from the vehicle 104 to the mobile device 102, which key may enable the mobile device 102 to either receive the token 302 (e.g., in response to a request for the token), or to enable use of a token already received by the mobile device 102.

Figure 5:
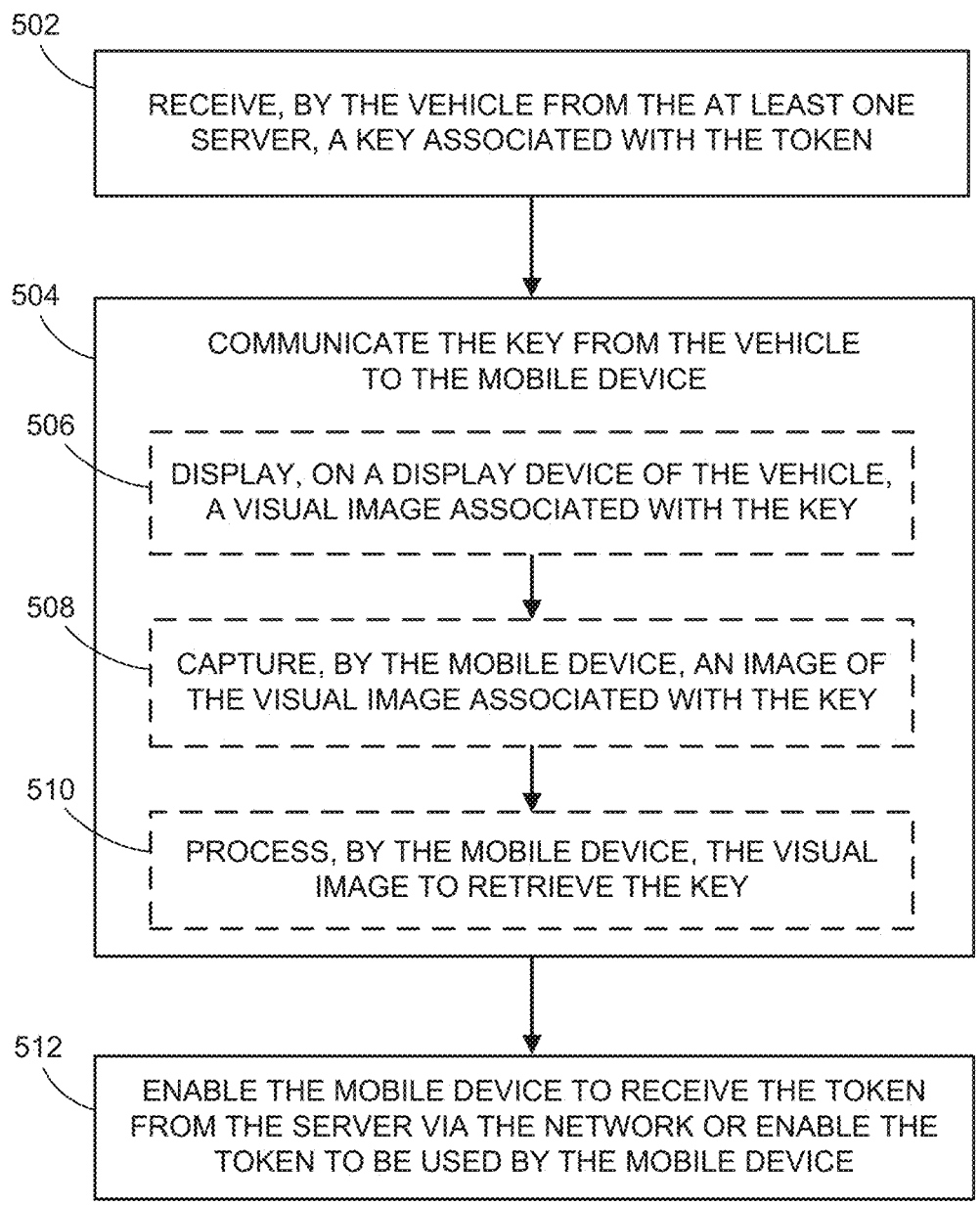
FIG. 5 shows a logic flow diagram illustrating various additional exemplary operations that may be performed by the system.

FIG. 5 shows another logic flow diagram illustrating various additional exemplary operations that may be performed by the system to verify the mobile device 102, which operations may comprise a method or part of a method performed by the system. FIG. 5 is discussed with reference to FIG. 4. In various examples, upon determining a need to generate and issue a token (e.g., in response to a request for the token from the vehicle 104, a user, e.g., via a mobile device 102, a fleet owner, or according to a smart contract), the token issuer 106 may generate the token on the distributed database. The token issuer 106 may also store the token, for example in its backend server. Additionally, the token issuer 106 may generate a key associated with the token. For example, the token may be encrypted, and the key may include a decryption key. The key may enable the mobile device 102 to request the token 302 from the node 314 (e.g., from the backend servers of the token issuer 106 or a third party) and/or to enable use of a token 302 the mobile device 102 has already received.

In FIG. 5, at 502, the vehicle 104 receives from the at least one server (e.g., node 314 or another node) the key associated with the token. In FIG. 4, this is shown at 406, where the node 314 sends the key 402 to the vehicle 104. In FIG. 5, at 504, the vehicle 104 communicates the key 402 to the mobile device 102. Similarly, the mobile device 102 receives from the vehicle 104 the key 402 associated with the token 302. The mobile station 102 may receive the key via its communication interface. In FIG. 4, the transfer of the key 402 from the vehicle 104 to the mobile station 102 is shown at 408.

There are many ways in which the vehicle 104 may communicate the key 402 to the mobile device 102. In various embodiments, the vehicle 104 may communicate the key 402 to the mobile device 102 using the same methods discussed above with respect to communicating a token to the mobile device 102 in the first approach. That is, the vehicle 104 may communicate the key 402 to the mobile device 102 using a communication protocol and/or network established between the mobile device 102 and the vehicle 104, for example, wirelessly using near-field communications, Bluetooth, or Wi-Fi, or directly wired via a USB or Lightning connection.

In one example approach, as is depicted in FIG. 5, the vehicle 104 may communicate the key 402 to the mobile device 102 by using visual images, such as barcodes, matrix barcodes, QR codes, or the like. As part of communicating the key 402 to the mobile device 102, the vehicle 104 may display a visual image associated with or representing the key 402 on a display device of the vehicle 104. For example, the vehicle may display a QR code or other visual representation of the key on its infotainment display or another display. At 508, the mobile device 102 captures an image of the visual image associated with the key displayed on the display device of the vehicle 104, for example, using a camera as part of its communication interface (e.g., a camera of a smartphone or tablet). At 510, the mobile device 102, having software capable of reading and understanding the visual image (e.g., QR code), can then process the captured visual image to retrieve the key. For example, the mobile device 102 may decode the data within the visual image, which itself may represent the key (e.g., a decryption key). Alternatively, the visual image may provide a link or other data that enables the mobile device 102 to obtain the key from another server or resource via the communication network 316.

Additionally, other methods of sending a key to the mobile device 102 may exist. As shown in FIG. 4, at 410, the mobile device 102 may receive the key 402 directly from a server (e.g., node 314 or another node) via the communication network 316 rather than receiving the key 402 from the vehicle 104. For example, if a mobile device 102 is registered with the token issuer 106, for example, as a proper recipient of a token 302, the token issuer 106 may directly communicate with the mobile device 102 to transfer the key 402. In one example, the token issuer 106 may send the mobile device 102 the key 402 via email or SMS text message, or through a software application executed on the mobile device 102. By sending the key 402 to the known mobile device 102, the token issuer 106 may know that the recipient of the key is the proper recipient of the token.

As shown in FIG. 5 at 512, upon receipt of the key 402 by the mobile device 102, the key 402 enables the mobile device 102 to receive the token 302 from the at least one server via the communicate network 316, and/or enables the token 302 to be used by the mobile device 102, for example, by enabling the mobile device 102 to decrypt the token 302. In this manner, a secondary form of authentication is disclosed that provides verification for the mobile device 102 receiving the token 302 as the proper recipient of the token 302.

As described herein transactions may be completed using tokens within a distributed database or distributed ledger, such as blockchain. In various examples, tokens, which may represent a right to perform a transaction, are transferred from the vehicle to a mobile device in order to enable the holder of the mobile device to complete the transaction at a POS location with which the vehicle cannot communicate. Further, although the above disclosure is explained within the contextual example of transferring tokens between a vehicle and mobile device, for purposes of purchasing goods or services for the vehicle, the present disclosure is not limited to that example context. For example, those of skill in the art will understand that the concepts disclosed above can be expanded to transfers between different mobile devices, or even within strings of transfers between different mobile devices and/or vehicles. Additionally, the purpose or use for the tokens is essentially limitless and can cover any sort of transaction or purpose that can be documented within the distributed database.

Systems according to the above disclosure can provide a direct impact on daily business in real-world blockchain applications developed for the mobility domain. For example, they can be used for direct payment within a store, where a token can be processed by an existing POS cashier systems for in-store payment/token redemption. Further, in accordance with this disclosure, tokens can operate as vouchers, paybacks, bonus/customer loyalty programs, and/or discounts. Tokens can be created based on service transactions logged to the distributed database and redeemed if required. Additionally, tokens can be used for multi-modal mobility payments to allow for payment across the whole mobility chain, including different methods of transportation (e.g., trains and busses). Many other application settings are possible and are within the scope of the present disclosure.

FIG. 6 illustrates an example architecture of a computer system 600 that may form part of or implement the various systems described above (for example, the servers and computers of the transaction network 110 and/or of the token issuer 106, the node 314, various computer portions of the vehicle 104, the mobile device 102, and the POS 108 system). The computer system 600 may include a set of instructions 645 that the processor 605 may execute to cause the computer system 600 to perform any of the operations or methods described above. The computer system 600 may operate as a stand-alone device or may be connected, e.g., using a network, to other computer systems or peripheral devices.

In a networked deployment, the computer system 600 may operate in the capacity of a server or as a client-user computer in a server-client user network environment, or as a peer computer system in a peer-to-peer (or distributed) network environment. The computer system 600 may also be implemented as or incorporated into various devices, such as a personal computer, the vehicle 104, or a mobile device 102, capable of executing the instructions 645 (sequential or otherwise) that specify actions to be taken by that machine. Further, each of the systems described may include any collection of sub-systems that individually or jointly execute a set, or multiple sets, of instructions to perform one or more computer functions.

The computer system 600 may include one or more memory devices 610 on a bus 620 for communicating information. In addition, code or instructions operable to cause the computer system to perform any of the operations and/or methods described above may be stored in the memory 610. The memory 610 may be a random-access memory, read-only memory, programmable memory, hard disk drive or any other type of memory or storage device. In various embodiments, the memory 610 may include a smart element (SE).

In some systems (e.g., but not in a smart chip), the computer system 600 may include a display 630, such as an LED display, a liquid crystal display (LCD), or any other display suitable for conveying information. The display 630 may act as an interface for the user to see the functioning of the processor 605, or specifically as an interface with the software stored in the memory 610 or in a drive unit 615.

Additionally, in various systems, the computer system 600 may include an input device 625, such as a keyboard, a mouse, a touchpad, a touchscreen, buttons, actuators, cameras, and microphones, configured to allow a user to interact with various components of system 600.

In various systems, the computer system 600 may also include a disk or optical drive unit 615. The disk drive unit 615 may include a computer-readable medium 640 in which the instructions 645 may be stored. The instructions 645 may reside completely, or at least partially, within the memory 610 and/or within the processor 605 during execution by the computer system 600. The instructions 645, when executed by the processor 605, may cause the processor 605 to perform any of the operations and/or methods discussed herein. The memory 610 and the processor 605 also may include computer-readable media as discussed above.

The computer system 600 may include a communication interface 635 to support communications via a communication network 650. The network 650 may include wired networks, wireless networks, or combinations thereof. The communication interface 635 network may enable communications via any number of communication standards, such as 802.11, 802.12, 802.20, WiMAX, cellular telephone standards, Bluetooth, or other communication standards. In various approaches, the communication interface 635 may comprise the input devices 625 (e.g., a camera) and the display 630 as devices that enable communication with the computer system 600.

Accordingly, the methods and systems may be realized in hardware, software, or a combination of hardware and software. The methods and systems may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a non-transitory computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

While methods and systems have been described with reference to certain embodiments, it will be understood by those skilled in the art that various changes may be made, and equivalents may be substituted without departing from the scope of the claims. Many other modifications may be made to adapt a particular situation or material to the teachings without departing from its scope. Therefore, it is intended that the present methods and systems not be limited to the particular embodiment disclosed, but that the disclosed methods and systems include all embodiments falling within the scope of the appended claims.

We claim:

1. A method comprising:
   issuing a token, the token defining a bond for a transaction associated with a vehicle and associated with an entity;
   transferring the token to a mobile device;
   communicating a key associated with the token from the vehicle to a mobile device, the communicating further comprising:
   displaying, on a display device of the vehicle, a visual image associated with the key;
   capturing, by the mobile device, an image of the visual image associated with the key; and
   processing, by the mobile device, the visual image to at least one of receive the token from at least one server via a network or enable the token to be used by the mobile device; and
   communicating the token from the mobile device directly to a point of sale (POS) device to enable completion of the transaction associated with the vehicle.

2. The method of claim 1, further comprising transferring the token to the mobile device from the vehicle.

3. The method of claim 2, further comprising transferring the token to the mobile device from the vehicle via near field communication.

4. The method of claim 2, further comprising the vehicle receiving the token from at least one server via a network prior to transferring the token to the mobile device.

5. The method of claim 1, wherein at least one server issues the token, wherein the method further comprises receiving, by the at least one server, a request to perform the transaction associated with the vehicle prior to issuing the token.

6. The method of claim 1, wherein the transaction associated with the vehicle comprises a purchase of at least one of goods or services for the vehicle, the purchase funded by the entity.

7. The method of claim 1, wherein the token triggers the transaction via a blockchain network.

8. The method of claim 1, wherein the mobile device comprises at least one of a smartphone, a chip card, or a vehicle key.

9. The method of claim 1, wherein the mobile device receives the token from at least one server via a network.

10. The method of claim 9, further comprising:
   receiving, by the vehicle from the at least one server, the key associated with the token.

11. A method comprising:
   transferring a token associated with a vehicle to a mobile device; and
   communicating the token from the mobile device directly to a second device, wherein the second device is out of communication range of the vehicle.

\* \* \* \* \*